United States Patent
Clemence et al.

(10) Patent No.: US 10,524,618 B1
(45) Date of Patent: Jan. 7, 2020

(54) BLENDER WITH VERTICALLY MOVABLE BLADES

(71) Applicants: Daylan Clemence, Kindersley (CA); Dale E. Clemence, Kindersley (CA)

(72) Inventors: Daylan Clemence, Kindersley (CA); Dale E. Clemence, Kindersley (CA)

(*) Notice: Subject to any disclaimer, the term of this patent is extended or adjusted under 35 U.S.C. 154(b) by 32 days.

(21) Appl. No.: 15/941,075

(22) Filed: Mar. 30, 2018

(51) Int. Cl.
*A47J 43/046* (2006.01)
*A47J 43/07* (2006.01)

(52) U.S. Cl.
CPC ......... *A47J 43/0722* (2013.01); *A47J 43/046* (2013.01)

(58) Field of Classification Search
CPC .................................................... A47J 43/046
USPC ........................................ 366/205, 289, 314
See application file for complete search history.

(56) References Cited

U.S. PATENT DOCUMENTS

| | | | |
|---|---|---|---|
| 238,599 A * | 3/1881 | Lusk | F04B 9/02 74/44 |
| 1,181,973 A * | 5/1916 | Tyson | B01F 11/0054 366/289 |
| 2,162,348 A | 6/1939 | Hacmac | |
| 2,282,866 A * | 5/1942 | Hagen | A47J 43/046 200/61.58 R |
| 2,284,155 A * | 5/1942 | Landgraf | A47J 43/046 200/61.58 R |
| 2,701,131 A | 8/1952 | Love | |
| 3,240,246 A * | 3/1966 | Dewenter | A47J 43/046 241/277 |
| 3,344,829 A * | 10/1967 | Ripple | A47J 43/046 241/282 |
| 3,352,543 A | 11/1967 | Niederman et al. | |
| 4,087,053 A * | 5/1978 | Voglesonger | A47J 43/046 241/282.1 |
| 4,548,508 A | 10/1985 | Verkler | |
| 5,645,346 A | 7/1997 | Thuna | |
| 6,027,242 A * | 2/2000 | Thuma | A47J 43/085 241/282.1 |
| 6,254,019 B1 | 7/2001 | Galbreath | |
| 6,805,312 B2 | 10/2004 | Capp | |
| 7,249,879 B2 | 7/2007 | Nabilsi | |
| 7,632,007 B2 | 12/2009 | Wulf et al. | |
| 2007/0047386 A1 | 3/2007 | Nia | |
| 2009/0193982 A1 | 8/2009 | Chou | |
| 2011/0248108 A1 | 10/2011 | Carriere | |

OTHER PUBLICATIONS

Ninja Ultima BL810 Review. Product review [online].The Real Blend [published on Apr. 18, 2014]. Retrieved from the Internet: <URL:http://therealblend.com/43/ninja-ultima-bl810-review/>.

* cited by examiner

*Primary Examiner* — David L Sorkin
(74) *Attorney, Agent, or Firm* — Cramer Patent & Design, PLLC (57) ABSTRACT

A blender has vertically reciprocating blades attached to a spindle. The blades, when activated, spins about the axis of the spindle. The spindle is also attached to a reciprocating motor which moves the spindle with blades attached up and down the interior of the blender cup.

14 Claims, 5 Drawing Sheets

BLENDER WITH VERTICALLY MOVABLE BLADES

RELATED APPLICATIONS

Not applicable.

FIELD OF THE INVENTION

The present invention relates generally to a blender having a blade assembly attached to a vertically reciprocating shaft within a blender jar.

BACKGROUND OF THE INVENTION

The common food blender is found in kitchens, restaurants, and bars all over the world. It does a very efficient job of pulverizing solids, mixing liquids, and changing consistencies of various food products. However, there are certain types of ingredients such as ice, powders, or similar solids which frequently do not blend completely. This is because the impeller blades operate in a void, and the remaining solids do not fall down to the bottom of the blender. This requires the operator to stop the blender, and manually stir it or even shake the entire blender. Obviously this takes additional time, and negatively impacts the quality of the blended food. Accordingly, there exists a need for a means by which complete and thorough blending of food products in a blender can occur regardless of the ingredient consistency. The use of the blender with vertically moving blades allows for the thorough and complete mixing of food ingredients in a blender in a manner which is quick, easy, and effective.

SUMMARY OF THE INVENTION

The principles of the present invention provide for such a blender that includes a blender jar, having a sidewall, an open jar top and a bottom aperture, a lid detachably connected to the jar top, a base assembly that includes a base housing, a drive means having a portion disposed within the base housing, and a control means in electrical communication with the drive means, and a blade attachable to and in mechanical communication with the drive means. The blender jar is secured to the base housing. The blade resides within the blender jar when attached to the drive means and the blender jar is secured to the base housing. The drive means is capable of simultaneously vertically driving the blade in an oscillating motion and rotating the blade.

It is an object of the present invention to provide such a blender jar to further include a pouring spout located on a side of the jar top, a handle that extends outwardly from the sidewall opposite the pouring spout, an aperture wall surrounding the bottom aperture, and a fastening feature located about the aperture wall, configured to enable the blender jar to removably fasten to the base housing. In at least one (1) embodiment, the blender jar further includes a plurality of side flutes formed on the sidewall.

It is another object of the present invention to provide such a drive means to include a bearing housing, a portion of which extends outward from the base housing, a motor in electrical communication with the control means, a motor sheave having a first end operably controlled by the motor and a second end, and a transmission operably controlled by the motor shaft and capable of vertical adjustment within the base assembly. In at least one (1) embodiment, the bearing housing has a bearing within an interior thereof, a shaft seal within an interior thereof, and a bearing housing flange located on a lower portion thereof and extending perpendicularly therefrom. The shaft seal prevents environmental communication with the bearing housing interior.

It is another object of the present invention to provide such a transmission to also include a drive sheave in mechanical communication with the motor sheave, an oscillator sheave in mechanical communication with the drive sheave, a worm in mechanical communication with the oscillator sheave, a worm gear in mechanical communication with the worm, a drive link in mechanical communication with the worm gear, an oscillator in mechanical communication with the drive link, an oscillating quill in mechanical communication with the oscillator, and a shaft coupling in mechanical communication between the oscillating quill and said blade.

It is yet another object of the present invention to provide such a blade that has an impeller shaft, having a first end capable of removable attachment to the shaft coupling and be operably driven thereby, at least one (1) impeller, each having a first end removably mounted to the impeller shaft, and an impeller shaft flange located at the impeller shaft first end capable of removable connection to the base housing.

It is yet another object of the present invention to provide such a base housing to also include an upper shell, a socket located at an upper side of the upper shell and having a connector, a lower shell fastenable to the upper shell, a plurality of drive support assemblies, each having a first end attached to an inner bottom surface of the lower shell and extending vertically upward therefrom, and a sub support plate attached to the second ends of the drive support assemblies. The impeller shaft flange is capable of removable attachment to the connector. The drive means and transmission are attached to and supported by the plurality of drive support assemblies. The bearing housing portion and connector extends therethrough.

It is still yet another object of the present invention to provide such a control means to include a control circuit disposed within the base housing and in electrical communication with the motor, a power switch, capable of providing electrical communication between the control circuit and a power source, and a rheostat in electrical communication with the control circuit.

It is still yet another object of the present invention to provide a clamp ring removably attaching the fastening feature to the bearing housing flange within the socket. Also, a sealing feature removably placed within the clamp ring is capable of preventing environmental communication with the blender jar through the bottom aperture.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 blender
20 blender jar
25 sidewall
30 side flute
35 top lip
40 top opening
45 threaded insert
50 bottom
55 bottom aperture
60 aperture wall
65 seal face
70 external thread
75 pour spout
80 handle
85 interior cavity
90 lid
95 lid grip
100 lid thread
110 impeller
115 blade
120 blade retainer
125 impeller shaft
130 bearing housing
135 bearing housing cavity
140 bearing housing flange
145 shaft seal
150 bearing
155 impeller shaft flange
160 connector
165 jar seal
170 clamp ring
175 ring thread
180 ring aperture
185 seal seat
270 base
275 shell
280 jar socket
285 bottom plate
290 footpad
310 cord
315 plug
500 speed control rheostat
505 power switch
510 oscillator support assemblies
515 engagement studs
520 sub support plate
525 motor
530 motor control circuit
535 pitcher shaft coupling
540 oscillating quill
545 oscillator shaft housing
550 worm, 64*p*, single thread, s/s
555 drive link
560 worm gear, 180*t*, 64 *p*
565 motor sheave
570 oscillator sheave
575 drive sheave
580 motor drive belt
585 oscillator drive belt
590 oscillator unit
595 linkage connection
600 reciprocating motion path
605 rotary motion path
700 reciprocating/rotary drive unit

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a blender (herein referred to as the "device") 10, intended to accomplish certain procedural steps in the processing of foodstuffs for consumption, having a rotary powered blade 115 which has the further capability of reciprocal vertical motion so as to be displaced through some portion of a removable blender jar 20 to more adequately slice and mix the contents therein. This reciprocating vertical motion of the blade 115 may be most advantageous when the device 10 is utilized on items having a more solid texture such as when crushing ice cubes.

Figure 1:
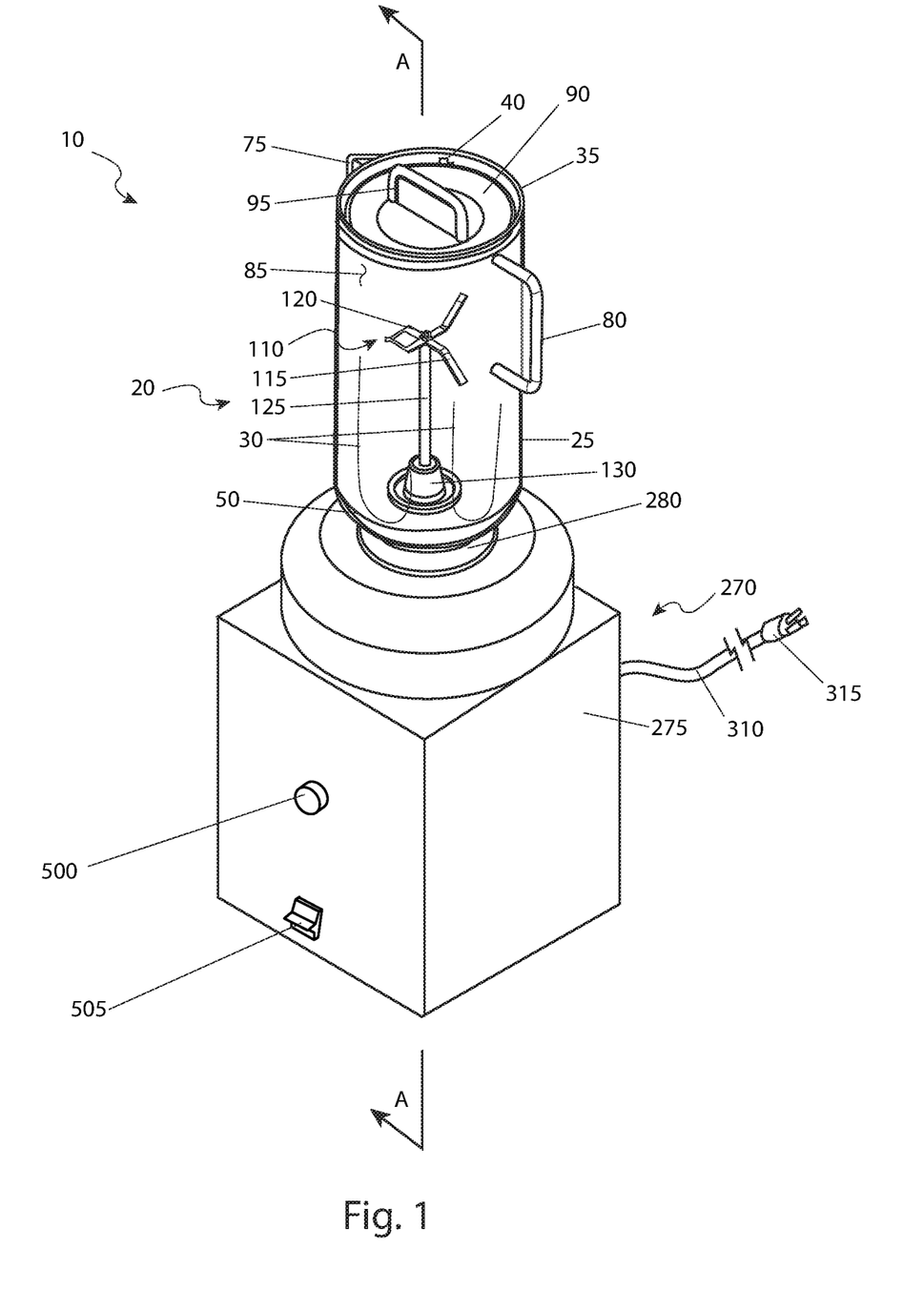
FIG. 1 is an isometric view of a blender 10 with vertically moving blades 115 in accordance with the preferred embodiment of the present invention.
Figure 2:
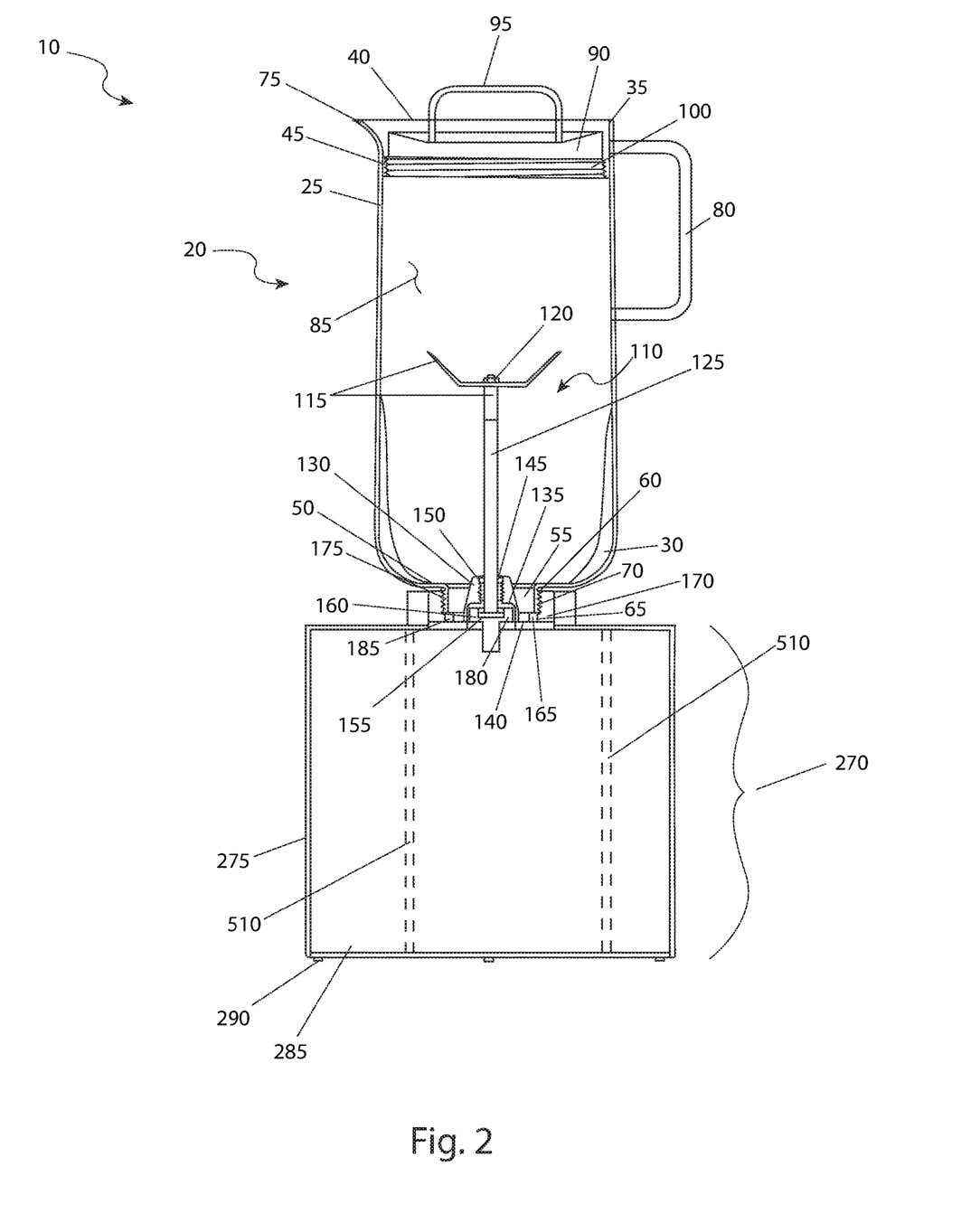
FIG. 2 is a section view along line A-A as seen in FIG. 1 of the blender 10 with vertically moving blades 115 in accordance with the preferred embodiment of the present invention.

Referring now to FIG. 1, an isometric view of the device 10, and FIG. 2, a section view along line A-A, as seen in FIG. 1, according to the preferred embodiment of the present invention, are disclosed. The device 10 includes a blender jar 20, having a detachable lid 90, and a motorized base 270 containing a speed control rheostat 500 and a power switch 505.

The blender jar 20 is composed preferably of a borosilicate glass to reduce marring caused by impacts and the undesirable retention of some food flavors. However, other materials, such as polycarbonate, or other polymer glass, may be utilized without limiting the scope of the device 10. It is envisioned that in some embodiments, additional metal salts may be introduced into the constituent material of the blender jar 20 at the time of manufacture in order to provide some color tint. The blender jar 20 is produced in a molding process to have certain physical shape features, such as a sidewall 25 having side flutes 30 to improve the circulation of the processing foodstuffs therein, as well as an external thread 70 around a circular bottom aperture wall 60 for the attachment of a clamp ring 170. The blender jar 20 is formed in one (1) piece with an encircling sidewall 25 joined to a domed bottom 50 along a smooth radius so as to envelope an internal cavity 85. A top lip 35 is disposed around an upper edge of the sidewall 25 to define a top opening 40. All foodstuffs placed within the interior cavity 85 are introduced through the top opening 40. A portion of the top lip 35 and the sidewall 25 is molded into a flared, generally "V"-shaped pour spout 75 groove. The pour spout 75 is intended to channel the flow of material exiting the interior cavity 85 over the top lip 35 when the blender jar 20 is tilted. An arcuate handle 80 is formed along the sidewall 25 opposite from the pour spout 75 by which a user may grasp the blender jar 20 for transportation or tilting to drain the contents.

As previously stated, side flutes 30 are disposed along the sidewall 25 for circulation primarily of contents that have been processed into slurry. The side flutes 30 are configured to be convex channels molded into the sidewall 25 to receive material pushed downwardly through the interior cavity 85 by the action of the blade 115 and redirect that material upwardly along the interior of the sidewalls 25 for further processing.

A threaded insert 45 is disposed along an inner face of the sidewall 25 in proximity to the top lip 35. The threaded insert 45 is configured to be a metal ring into which a spiral thread of some profile has been cut. The threaded insert 45 is securely fitted into the interior cavity 85 in order to retain a lid 90. The lid 90 is configured to be a disk composed of a rigid thermoplastic material provided for a covering of the top opening 40. Disposed on an upper face of the lid 90 is a lid grip 95 which can be utilized to rotate and otherwise move the lid as necessary. A lid thread 100 is formed along the peripheral face of the disk. The lid thread 100 is complimentary to the thread of the threaded insert 45 so that the lid may be secured to the blender jar 20 during operation to obviate splashing any contents out of the interior cavity 85.

A bottom aperture 55 is centrally located in the bottom 50 of the blender jar 20. This bottom aperture 55 provides access for the insertion of an impeller 110 mounted to an impeller shaft 125. The aperture wall 60 surrounds the bottom aperture 55. A lower planar face of that aperture wall 60 is a seal face 65 against which the jar seal 165 is pressed in order to retain the contents of the interior cavity 85.

The impeller 110 is provided with a plurality of contoured stainless steel blades 115. The blades 115 are secured to a first end of the impeller shaft 125 by means of a threaded blade retainer 120. The blades 115 are configured to cut through foodstuffs to be processed and press that processed food downwardly through the interior cavity 85 toward the bottom 50 of the blender jar 20.

A bearing housing 130 is disposed at the bottom 50 of the blender jar 20 located in the bottom aperture 55. The bearing housing 130 is a drawn metal shell having a bearing housing cavity 135 provided with the necessary features, such as the appropriate bores and shoulders to accept and retain a shaft seal 145 and a bearing 150. The shaft seal 145 is a commercially available device, equipped with a resilient elastomer element, capable of inhibiting the flow of any material into the bearing housing 130 from the blender jar 20. The bearing 150 is a commercially available needle roller bearing 150. Other types of rolling elements, such as ball bearings 150, may be utilized without limiting the scope of the device 10. The bearing housing 130 is configured to have a generally planar bearing housing flange 140 at a lower end. The bearing housing flange 140 is a ring of material extending perpendicularly from bearing housing 130. The bearing housing flange is intended to work in conjunction with a jar seal 165 pressed against the seal face 65 of the aperture wall 60 and retained by the clamp ring 170 to obviate the leakage of any material from the bottom 50 of the blender jar 20. The clamp ring 170 is composed of an injection molded thermoplastic and provided with the necessary peripheral features to allow a user to easily tighten the internal ring threads 175 against the external thread of the aperture wall 60 so as to accomplish the previously described seal. Disposed on the interior of the clamp ring 170 is seal seat 185 configured to be a planar face oriented perpendicular to the central axis of the ring thread 175 for the purpose of pressing the bearing housing flange 140 against the jar seal 165 and the aperture wall 60. The jar seal 165 is configured to be a resilient elastomer washer having parallel planar faces adequate for the intended sealing purpose. The clamp ring 170 is also provided with a ring aperture 180 through which the impeller shaft 125 is permitted to pass.

Disposed at a second end of the impeller shaft 125 is an impeller shaft flange 155. The impeller shaft flange 155 is provided with a geometric profile, such as a hexagon, to selectively fit within a connector 160. The impeller shaft flange 155 is configured to be removably attached to the connector 160 so that the blender jar 20 with the enclosed impeller 110 may be selectively removed from the base 270 for emptying and cleaning.

The base 270 is preferably comprised of a rigid thermoplastic material and constructed from a plurality of injection-molded shell 275 parts to house interior components as will be described herein below. The various pieces of the shell 275 are envisioned to be fastened together by the use of a plurality of threaded fasteners. A bottom plate 285, preferably fabricated from a metal, such as carbon steel, is disposed at a bottom face of the base 270 and provides the necessary structural support for oscillator support assemblies 510. A plurality of footpads 290, configured to be resilient elastomer disks, are attached to the bottom plate 285 to provide stability to the device as well as obviating any marring to the support surface. It is also appreciated that the base 270 can have no plurality of shell 275 parts or fasteners, and the shell 270 itself is a unitary construction.

Disposed on an upper surface of the base 270 is a jar socket 280 configured to be an annular ring molded to conform to the profile of the clamp ring 170. In use, the assembled blender jar 20, with the clamp ring 170 engaged in the external thread 70 of the aperture wall 60, will be inserted into the jar socket 280 as a primary means of supporting the blender jar 20 in an upright position and simultaneously connecting the impeller shaft 125 to the connector 160 in the base 270.

Figure 3:
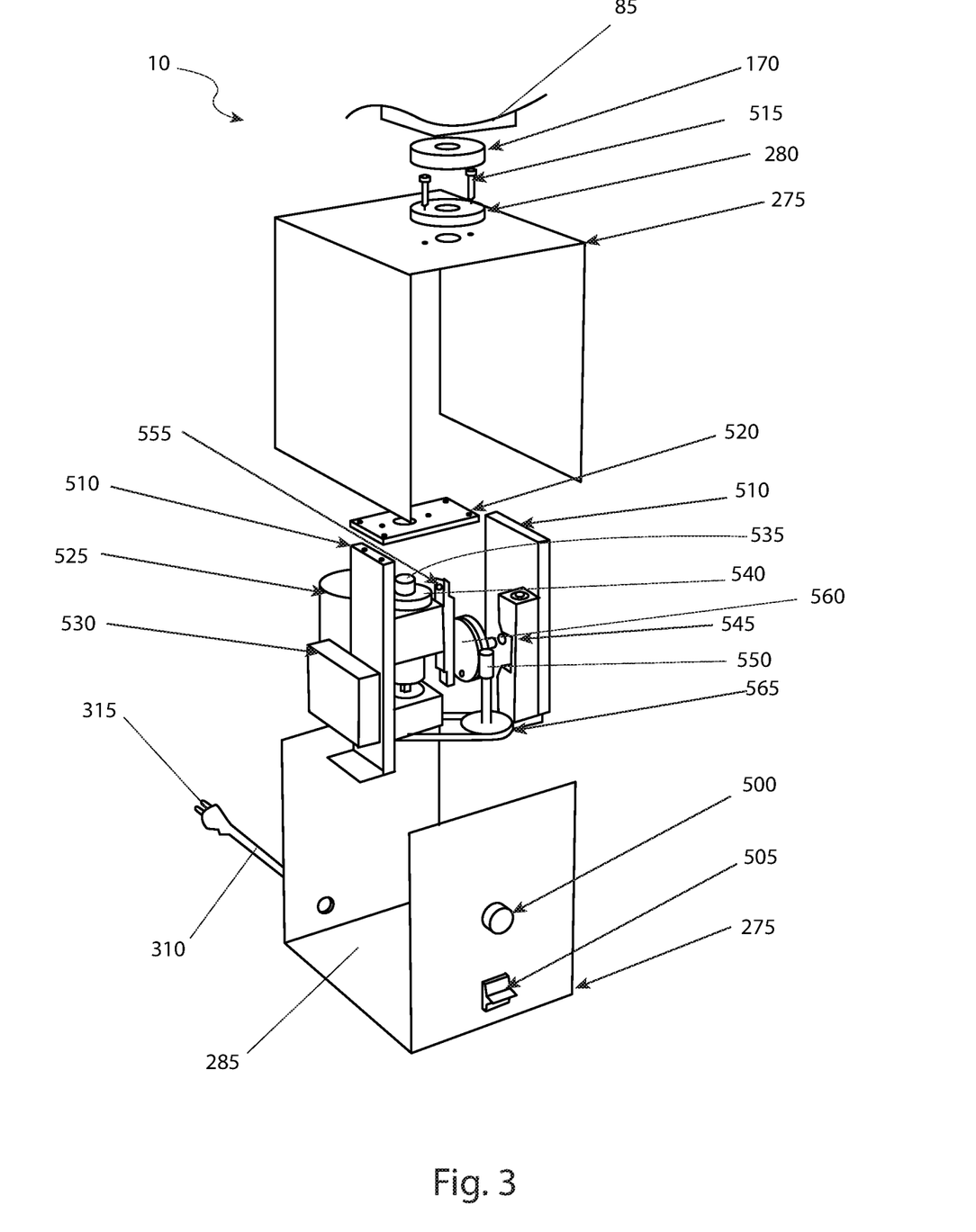
FIG. 3 is an exploded parts view of the device 10 in accordance with the preferred embodiment of the present invention.

Referring now to FIG. 3, an exploded parts view of the device 10 in accordance with the preferred embodiment of the present invention is depicted. The interior cavity 85 is partially shown at the uppermost portion of the figure, with the clamp ring 170 arranged in a linear manner. The shell 275 is provided in an upper and lower clamshell arrangement as shown. The jar socket 280 is fastened to the upper shell 275 with the aid of two (2) engagement studs 515. The speed control rheostat 500 and the power switch 505 is located in a forward-facing position on the lower shell 275. A cord 310 with an associated plug 315 exit the rear of the lower shell 275 which power the blender 10. Further detail on the electrical operation of the blender 10 will be provided herein below.

The oscillator support assemblies 510 form vertical structures to hold internal components of the blender 10 and are mechanically fastened to the bottom plate 285. A sub support plate 520 is physically fastened to span the top of the two (2) oscillator support assemblies 510 and thus form a physically stable structure. A motor 525, operated through a motor control circuit 530, and connected to the cord 310 through the speed control rheostat 500 and the power switch 505 is used to convert electrical energy to mechanical energy to operate the blender 10. The motor 525 can be of any of a variety of commercially available, copper wound, small frame, multiple speed motors energized by 110-VAC, and capable of generating sufficient torque to induce the desired motion in the impeller 110 (as shown in FIGS. 1 and 2). The mechanical connection of the motor 525 will be explained in greater detail elsewhere in this narrative. Also shown in FIG. 3 are a pitcher shaft coupling 535, an oscillating quill 540, an oscillator shaft housing 545, a worm, 64p, single thread, s/s 550, a drive link 555, a worm gear, 180t, 64 p 560 and a motor sheave 565, all of which will be described in greater detail herein below.

Figure 4:
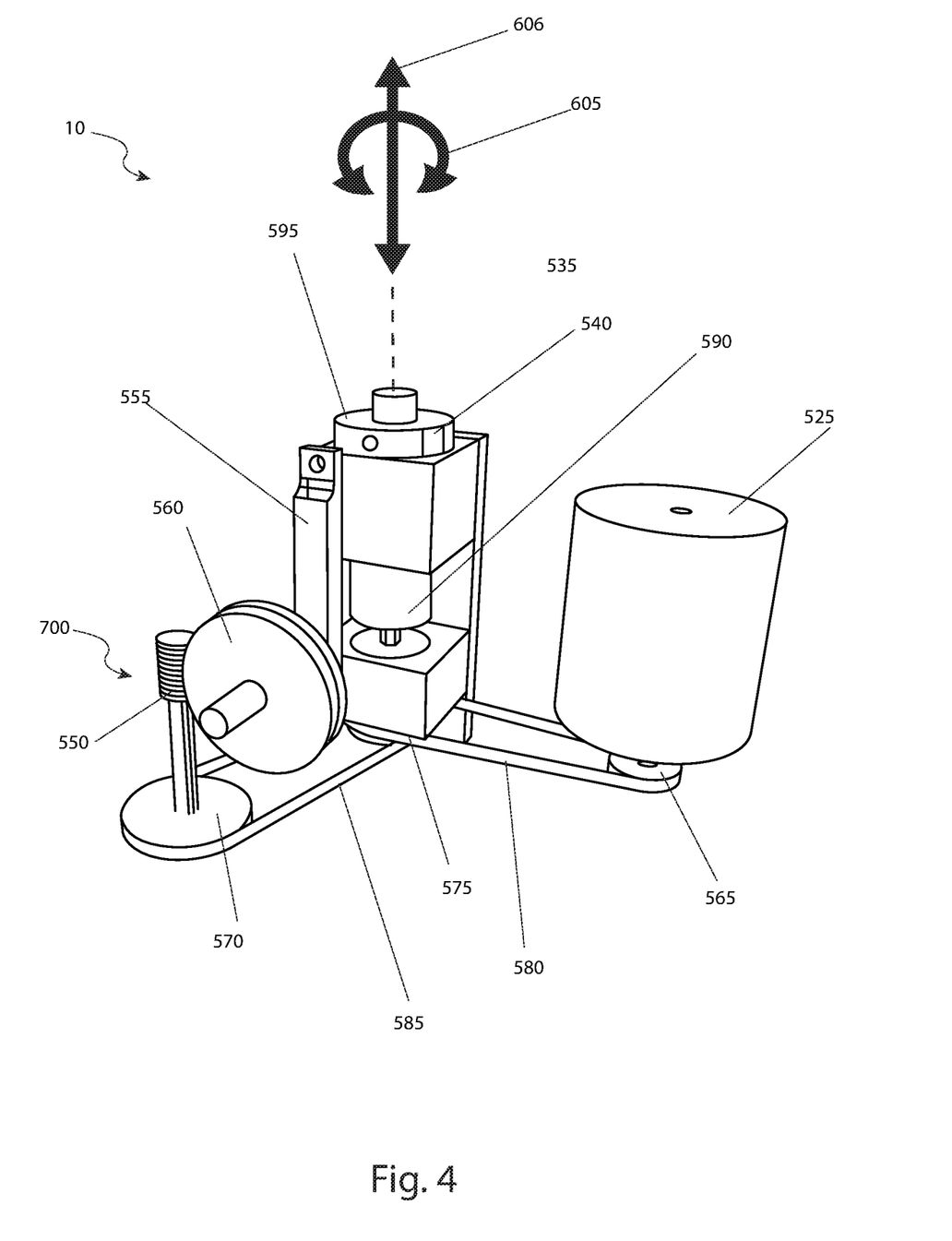
FIG. 4 is a detailed perspective view of the reciprocating/rotary drive unit 700 as used with the blender 10 in accordance with the preferred embodiment of the present invention; and, FIG. 5 is an operational block diagram of the device 10 in accordance with the preferred embodiment of the present invention.

Referring next to FIG. 4, a detailed perspective view of the reciprocating/rotary drive unit 700 as used with the blender 10 in accordance with the preferred embodiment of the present invention is disclosed. Rotary motion from the motor 525 is transferred to a motor sheave 565 and in turn to a drive sheave 575 via a motor drive belt 580. Likewise, rotary action from the drive sheave 575 is transferred by an oscillator drive belt 585 to an oscillator sheave 570. As the oscillator sheave 570 rotates, the worm, 64p, single thread, s/s 550 is driven rotationally as well. As such the worm nature of the worm, 64p, single thread, s/s 550 drives the worm gear, 180t, 64 p 560 thus producing rotation. An offset protrusion (not shown due to illustrative limitations) on the rear of the worm gear, 180t, 64 p 560 then displaces the drive link 555 in a distance equal to the diameter of the offset protrusion. As such, this reciprocation motion of the drive link 555 is transferred via a linkage connection 595 to a oscillator unit 590 and thus the oscillating quill 540 and pitcher shaft coupling 535. As the pitcher shaft coupling 535 and the oscillating quill 540 are already rotating due the -drive sheave 575, a simultaneous reciprocating motion path 600 and rotary motion path 605 is produced. This motion is transferred to the impeller shaft 125 (as shown in FIG. 2) to produce the desired motion as aforementioned described of the blade 115 within the interior cavity 85.

Figure 5:
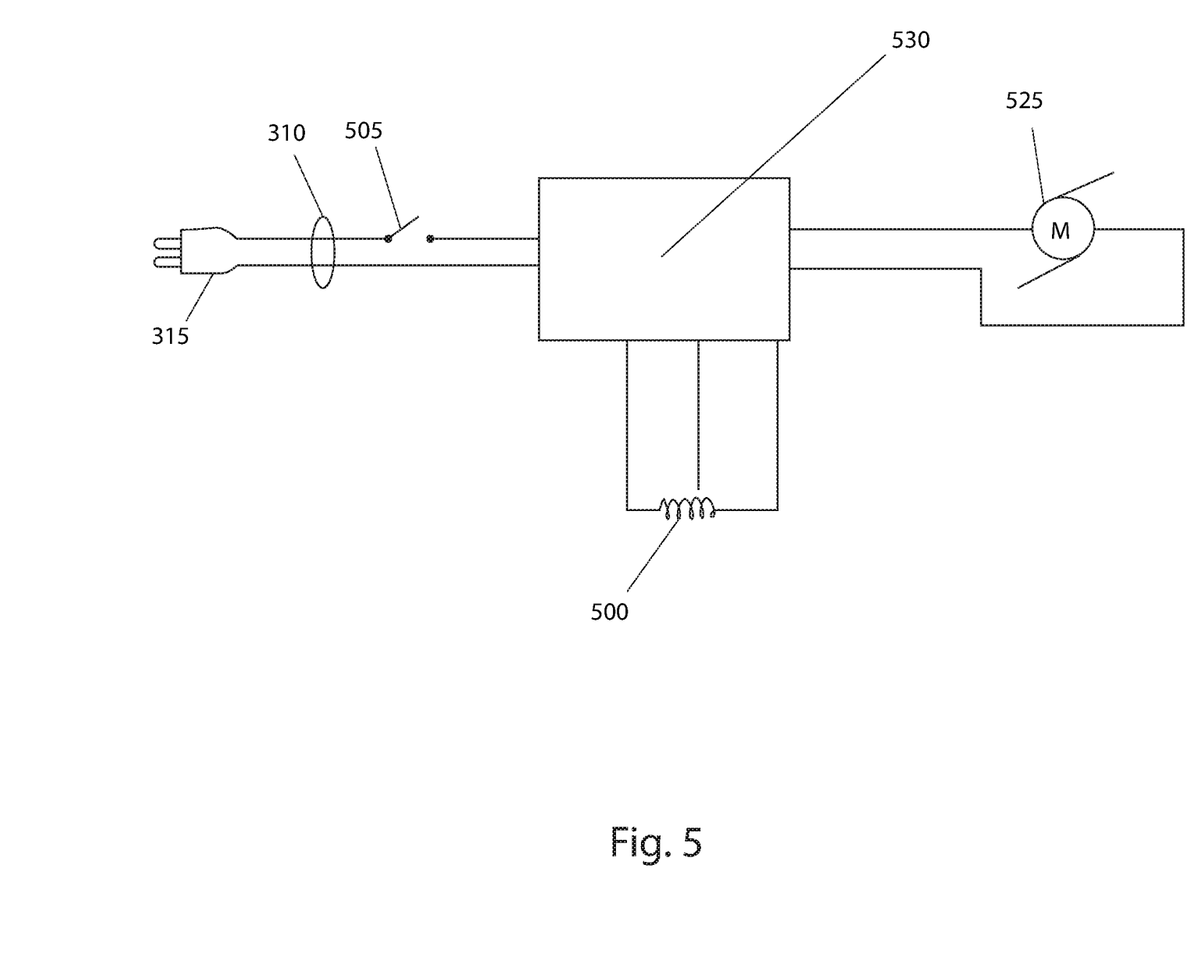

Referring finally to FIG. 5, an operational block diagram of the device 10 in accordance with the preferred embodiment of the present invention is depicted. Electrical power is provided by the cord 310 and the plug 315 and controlled by the power switch 505. The controlled power serves as an input to the motor control circuit 530 along with the additional control input of the speed control rheostat 500. Resultant output, controlled by voltage, frequency, and/or current is then routed to the motor 525 which produces variable speed and thus variable control of the blender 10 depending on various food stuffs.

In accordance with the invention, the illustrated embodiment can be utilized by an enabled individual in a simple and straightforward manner with little or no training. After initial purchase or acquisition of the device 10, it would be installed as indicated in FIG. 1.

The method of installing and utilizing the device 10 may be achieved by performing the following steps: acquiring a model of the device 10 having a desired style to suit the taste of a user; selecting a clear, level, dry, planar support surface upon which to place the device 10; extending the cord 310; inserting the plug 315 into an appropriate electrical receptacle; installing the blender jar 20 onto the base 270; grasping the lid grip 95; rotating the lid 90 so as to disengage the lid thread 100 from the threaded insert 45; removing the lid 90, thereby exposing the top opening 40; inserting the selected food items into the interior cavity 85 through the top opening 40; returning the lid 90 to the top opening 40; rotating the lid 90 so as to engage the lid thread 100 with the threaded insert 45; selecting the desired processing speed by rotation of the speed control rheostat 500; activation of the on/off switch 505; allowing the device 10 to function in the normal manner of rotating the blades 115 while displacing the impeller 110 in a reciprocal motion; removing the lid 90 from the top opening 40 when blending and/or mixing operations are complete; grasping the handle 80 so as to maneuver the blender jar 20; removing the blender jar 20 from the base 270; tipping the blender jar 20 so as to allow the contents to flow over the top lip 35 at the pour spout 75; repeating this procedure as required to complete the task; and cleaning the device 10. The blender jar 20, as well as the components within the interior cavity 85, and the lid 90 may require cleaning prior to a first use.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A blender, comprising:
   a blender jar having a sidewall, an open jar top, and a bottom aperture;
   a lid detachably connected to said jar top of said blender jar;
   a base assembly having a base housing, a drive means having a portion disposed within said base housing, and a control means in electrical communication with said drive means; and
   a blade attached to and in mechanical communication with said drive means;
   wherein said blender jar is secured to said base housing;
   wherein said blade resides within said blender jar when attached to said drive means and said blender jar is secured to said base housing; and
   wherein said drive means is capable of simultaneously vertically driving said blade in an oscillating motion and rotating said blade;
   wherein said blender jar further comprises a pouring spout located on a side of said jar top, a handle extending outwardly from said sidewall opposite said pouring spout, an aperture wall surrounding said bottom aperture, and a fastening feature located about said aperture wall configured to enable said blender jar to removably fasten to said base housing;
   wherein said drive means comprises a bearing housing having a portion of which extends outward from said base housing, comprising a bearing within an interior thereof, a shaft seal within an interior thereof, and a bearing housing flange located on a lower portion thereof and extending perpendicularly therefrom, a motor in electrical communication with said control means, a motor sheave having a first end operably controlled by said motor and a second end, and a transmission operably controlled by said motor shaft, wherein said shaft seal prevents environmental communication with said bearing housing interior;
   wherein said transmission further comprises a drive sheave in mechanical communication with said motor sheave, an oscillator sheave in mechanical communication with said drive sheave, a worm in mechanical communication with said oscillator sheave, a worm gear in mechanical communication with said worm, a drive link in mechanical communication with said worm gear, an oscillator in mechanical communication with said drive link, an oscillating quill in mechanical communication with said oscillator, and a shaft coupling in mechanical communication between said oscillating quill and said blade.

2. The blender of claim 1, wherein said blade further comprises:
an impeller shaft having a first end capable of removable attachment to said shaft coupling and be operably driven thereby;
at least one impeller each having a first end removably mounted to said impeller shaft; and
an impeller shaft flange located at said impeller shaft first end capable of removable connection to said base housing.

3. The blender of claim 2, wherein said base housing further comprises:
an upper shell;
a socket located at an upper side of said upper shell having a connector;
a lower shell fastenable to said upper shell;
a plurality of drive support assemblies each having a first end attached to an inner bottom surface of said lower shell and extending vertically upward therefrom; and
a sub support plate attached to said second ends of said drive support assemblies;
wherein said impeller shaft flange is capable of removable attachment to said connector;
wherein said drive means and said transmission are attached to and supported by said plurality of drive support assemblies; and
wherein said bearing housing portion and said connector extends therethrough.

4. The blender of claim 2, wherein said control means further comprises:
a control circuit disposed within said base housing and in electrical communication with said motor;
a power switch capable of providing electrical communication between said control circuit and a power source; and
a rheostat in electrical communication with said control circuit.

5. The blender of claim 4, wherein said blender jar further comprises a plurality of side flutes formed on said sidewall.

6. The blender of claim 4, further comprising a clamp ring removably attaching said fastening feature to said bearing housing flange, within said socket.

7. The blender of claim 6, further comprising a sealing feature removably placed within said clamp ring, capable of preventing environmental communication with said blender jar through said bottom aperture.

8. A blender, comprising:
a blender jar having a sidewall, an open jar top and a bottom aperture;
a lid detachably connected to said jar top of said blender jar;
a base assembly having a base housing, at least one foot pad located on a bottom surface thereof, a drive means, having a portion disposed within said base housing, and a control means in electrical communication with said drive means; and
a blade attachable to and in mechanical communication with said drive means;
wherein said blender jar is secured to said base housing;
wherein said blade resides within said blender jar when attached to said drive means and said blender jar is secured to said base housing; and
wherein said drive means is capable of simultaneously vertically driving said blade in an oscillating motion and rotating said blade;
wherein said blender jar further comprises a pouring spout located on a side of said jar top, a handle extending outwardly from said sidewall opposite said pouring spout, an aperture wall surrounding said bottom aperture, and a fastening feature located about said aperture wall configured to enable said blender jar to removably fasten to said base housing;
wherein said drive means comprises a bearing housing having a portion of which extends outward from said base housing, comprising a bearing within an interior thereof, a shaft seal within an interior thereof, and a bearing housing flange located on a lower portion thereof and extending perpendicularly therefrom, a motor in electrical communication with said control means, a motor sheave having a first end operably controlled by said motor, and a second end, and a transmission operably controlled by said motor shaft, wherein said shaft seal prevents environmental communication with said bearing housing interior;
wherein said transmission further comprises a drive sheave in mechanical communication with said motor sheave, an oscillator sheave in mechanical communication with said drive sheave, a worm in mechanical communication with said oscillator sheave, a worm gear in mechanical communication with said worm, a drive link in mechanical communication with said worm gear, an oscillator in mechanical communication with said drive link, an oscillating quill in mechanical communication with said oscillator, and a shaft coupling in mechanical communication between said oscillating quill and said blade.

9. The blender of claim 8, wherein said blade further comprises:
an impeller shaft having a first end capable of removable attachment to said shaft coupling and be operably driven thereby;
at least one impeller each having a first end removably mounted to said impeller shaft; and
an impeller shaft flange located at said impeller shaft first end capable of removable connection to said base housing.

10. The blender of claim 9, wherein said base housing further comprises:
an upper shell;
a socket located at an upper side of said upper shell having a connector;
a lower shell fastenable to said upper shell;
a plurality of drive support assemblies each having a first end attached to an inner bottom surface of said lower shell and extending vertically upward therefrom; and
a sub support plate attached to said second ends of said drive support assemblies;
wherein each foot pad is affixed to an outer bottom surface of said lower shell;
wherein said impeller shaft flange is capable of removable attachment to said connector;
wherein said drive means and said transmission are attached to and supported by said plurality of drive support assemblies; and
wherein said bearing housing portion and said connector extends therethrough.

11. The blender of claim 9, wherein said control means further comprises:

a control circuit disposed within said base housing and in electrical communication with said motor;

a power switch capable of providing electrical communication between said control circuit and a power source; and a rheostat in electrical communication with said control circuit.

12. The blender of claim 11, wherein said blender jar includes a plurality of side flutes formed on said sidewall.

13. The blender of claim 11, further comprising a clamp ring removably attaching said fastening feature to said bearing housing flange within said socket.

14. The blender of claim 13, further comprising a sealing feature removably placed within said clamp ring capable of preventing environmental communication with said blender jar through said bottom aperture.

* * * * *